United States Patent [19]

Topper et al.

[11] Patent Number: 5,298,981
[45] Date of Patent: Mar. 29, 1994

[54] COLOR SIGNAL APERTURE CORRECTION SYSTEM HAVING AUTOMATICALLY SELECTED SOURCE SIGNAL

[75] Inventors: Robert J. Topper, Hatboro, Pa.; Lee R. Dischert, Medford, N.J.

[73] Assignee: Panasonic Technologies, Inc., Secaucus, N.J.

[21] Appl. No.: 964,707

[22] Filed: Oct. 22, 1992

[51] Int. Cl.$^5$ .................. H04N 9/64; H04N 5/208; H04N 5/14

[52] U.S. Cl. ......................... 348/630; 348/571

[58] Field of Search ............ 358/21 R, 27, 160, 162, 358/37, 166, 28, 39, 40; H04N 9/64, 5/208, 5/14

[56] References Cited

U.S. PATENT DOCUMENTS

| | | | |
|---|---|---|---|
| 3,681,520 | 8/1972 | Schneider | 358/37 |
| 3,732,360 | 5/1973 | Breimer et al. | 358/37 |
| 4,209,801 | 6/1980 | Dischert et al. | 358/37 |
| 4,748,500 | 5/1988 | Lacoste et al. | 358/37 |
| 4,823,190 | 4/1989 | Yamamoto | 358/37 |

Primary Examiner—Mark R. Powell
Assistant Examiner—John W. Miller
Attorney, Agent, or Firm—Ratner & Prestia

[57] ABSTRACT

A color video camera includes circuitry which generates a peaking signal that is applied to each of the color signals to enhance high-frequency components of the video signal relative to low-frequency components. The circuitry adds high-frequency components from the green video signal, as the peaking signal, at instants when the amplitudes of the green and red color signals are approximately equal. If there is a significant difference between the amplitudes of the red and green video signals, however, a combination of the high frequency components of both of these signals is used as the peaking signal. In one exemplary embodiment of the invention, the peaking signal includes in-band horizontal and vertical contour signals and out-of-band aperture correction signal.

8 Claims, 4 Drawing Sheets

COLOR SIGNAL APERTURE CORRECTION SYSTEM HAVING AUTOMATICALLY SELECTED SOURCE SIGNAL

BACKGROUND OF THE INVENTION

This invention concerns apparatus for performing aperture correction on color signals produced in a color video camera or in a color video signal processor. In particular, it relates to apparatus which monitors the color content of a scene represented by the video signals and automatically selects one or more of the color component signals to serve as the source signal for the aperture correction system.

In video signal processing, aperture correction, also called contour correction or peaking, is a technique by which video signals are processed to emphasize high-frequency components relative to low-frequency components. The effect produced compensates for beam or pixel size (aperture).

High-frequency components in video signals correspond to the edges of objects in the image. A scene containing many small sharply-defined objects is represented by video signals having larger high-frequency components than a scene containing large poorly defined objects. Signal peaking is performed for two reasons: to compensate for aperture distortion in the video camera or video display device and to add extra emphasis to edges in a video display.

The term aperture distortion or aperture rolloff refers to any quality of the video camera or video display device which undesirably increases the minimum size of a pixel. For a video camera, this includes distortion caused by optical elements of the camera, the physical limitations on pixel size caused by the imaging device and any low-pass filtering effect of the electronic components of the camera. Signal processing steps which reduce this type of distortion are often referred to as aperture correction.

Psycho-optic experiments performed in the early days of color television demonstrated that people find images having clearly defined edges to be more pleasing than ones having ill-defined edges. Accordingly, most video cameras and most television receivers in use today allow high-frequency components of the video signals to be boosted in amplitude or "peaked" relative to the lower-frequency components. This type of correction is referred to as peaking or contour correction.

In most video signal standards in use today, the higher-frequency components of the image are represented entirely in the luminance signal. Consequently, aperture correction or peaking is a processing step which is applied to the luminance signal or to each of the primary color signals equally.

Conventional video signal processing systems detect high frequencies in the video signal by monitoring one of the red (R), green (G) and blue (B) primary color signals. Since the green video signal generally contributes the most energy to the luminance signal, it is chosen as the source signal for aperture correction.

A single video signal is selected rather than a combination of two or three of the signals R, G and B, to prevent misregistered portions of the image from being emphasized. If, for example, the source signal to the aperture correction circuitry is a combination of the red signal and the green signal (e.g. a yellow object), and the red image produced by the camera is not precisely registered with the green image, the signal produced by the camera would have both the red edges and the green edges emphasized and, so, would highlight the misregistration of the images. This would appear as a green and/or red border around the yellow object.

One alternative approach for selecting the source signal to be used by aperture correction circuitry is used by SONY in their second-generation HDC300 camera. In this camera, the video operator may select between a combination of the red, green and blue signals; the green and red signals; the green and blue signals; or one of the red, green or blue signals individually as the source signal for the aperture correction circuitry. This choice allows the video operator to selectively peak the video signal according to the requirements of the program and lighting directors.

A problem with either of these systems is that if a single color signal is used as the source signal for the peaking circuitry, then edges of colored objects which are not the selected color are not emphasized. If, however, multiple color signals are selected as the source signal, then misregistration errors are emphasized.

SUMMARY OF THE INVENTION

The present invention is embodied in signal peaking circuitry which selects its source signal based on the instantaneous content of the video image signals to emphasize most of the high-frequency components of the image while avoiding emphasis of misregistration errors. In one exemplary embodiment of the invention, the circuitry monitors first and second ones of the three primary color signals to determine when to apply contour correction. When no low-frequency information is detected a signal representing the difference between the two primary color signals, the high-frequency information from that channel is amplified and applied to all of the primary color signals. If, however, low-frequency information is detected in the difference signal, then a combination of the first and second primary color signals is used to generate the peaking signal. In either case, the peaking signal is applied to each of the three color signals equally.

According to one aspect of the invention, circuitry includes separate vertical contour correction circuitry and horizontal contour correction circuitry where the vertical contour correction circuitry uses the first primary color signal as its source signal while the horizontal contour correction circuitry uses either the first primary color signal or a combination of the first and second primary color signals as its source signal depending on the content of the scene.

According to another aspect of the invention, the system includes aperture correction circuitry which compensates for high-frequency roll-off in the video image signals developed by a camera. This circuitry generates an aperture correction signal which is added to the horizontal and vertical contour signals to generate the peaking signal.

BRIEF DESCRIPTION OF THE DRAWINGS

FIG. 2b is a block diagram, partly in logic diagram form, of a decision device suitable for use in the circuitry shown in FIG. 2a.

DETAILED DESCRIPTION

Figure 1:
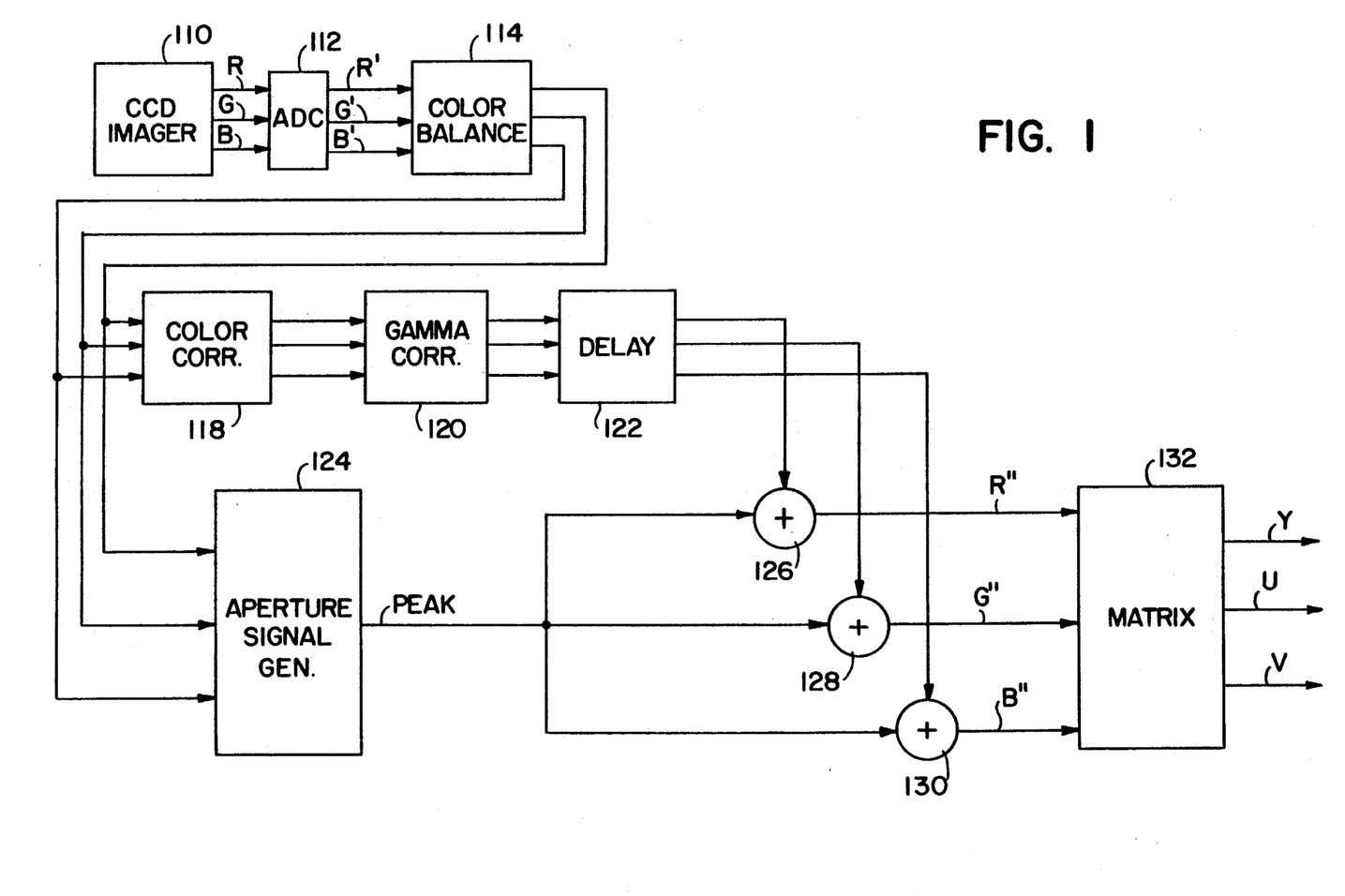
FIG. 1 is a block diagram of an exemplary color video camera which includes an embodiment of the present invention.

In the exemplary camera shown in FIG. 1, a CCD imager 110 provides red (R), green (G) and blue (B) signals representing a color image. The CCD imager 110 may include, for example, a conventional CCD matrix having an integral color filter mosaic and circuitry which processes the signals provided by the CCD matrix to generate separate red, green and blue color signal components.

The analog red, green and blue signals provided by the CCD imager 110, are applied to analog-to-digital converter (ADC) 112 which generates respective digitally sampled red R', green G' and blue B' color signals. The digitized color signals provided by the ADC 112 are applied to color-balance circuitry 114. Circuitry 114 automatically adjusts amplification factors applied to the respective digital signals so that the brightest object in the camera's field of view will appear white on the reproduced image. The color-balance calibration is performed once during the initial camera set-up. The gain factors developed in this calibration step, however, are applied to the R', G' and B' signals provided by the ADC 112 during the remainder of normal imaging operation. If a signal exceeds the maximum amplitude value which can be represented by a digital signal value, for example, 255 for an 8-bit digital sample, the color-balance circuit 114 limits the value of that signal to the maximum digital value.

Red, green and blue color signals ($R_b$, $G_b$ and $B_b$) provided by the color balance circuit 114 are applied in parallel to color correction circuitry 118 and to an aperture signal generator 124. The color correction circuitry 118 may, for example, process the color signals $R_b$, $G_b$ and $B_b$ provided by the circuitry 114 to generate color-shifted red, green and blue signals which produce correct image hues on a target image device. The circuitry 118 effectively converts the colors passed by the color filters used in the CCD imager 110 into signals which will reproduce the image colors correctly under a target video standard (e.g. NTSC, PAL or SECAM).

The corrected color signals provided by the circuitry 118 are applied to gamma correction circuitry 120. Gamma correction circuitry 120 applies a non-linear transfer function to the corrected red, green and blue color signals produced by the circuitry 118 to provide signals which generate proper gray-scale images under a target video standard (e.g. NTSC, PAL or SECAM).

The output signals provided by the gamma correction circuitry 120 are delayed through a delay element 122, which compensates for signal processing delays through the aperture signal generator 124, and are then applied to respective adders 126, 128 and 130. The other input signal to each of the adders 126, 128 and 130 is a peaking signal generated by the aperture signal generator 124. This peaking signal is a high-frequency signal which is added to all of the component color signals. The effect of this operation is to emphasize high-frequency components in the image signal relative to low-frequency components.

In the exemplary NTSC camera shown in FIG. 1, the signal PEAK is added in equal proportion to the respective red, green and blue color signals. Processed in this manner, the signal PEAK acts to emphasize the high-frequency components of the image as a monochrome signal. That is to say, the effect it produces is visible mainly in the luminance signal, Y, produced by the camera.

The output signals (R", G" and B") of the adders 126, 128 and 130 are applied to a matrix 32 which generates the luminance signal, Y, and two color difference signals, I and Q, from the three primary color signals R", G" and B".

Figure 2A:
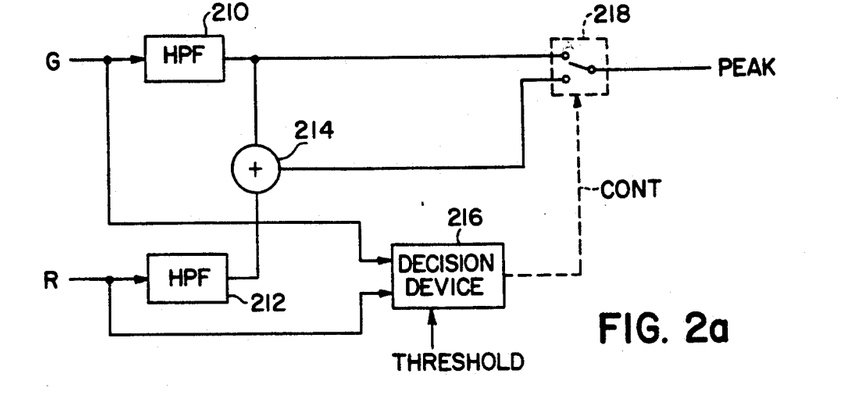
FIG. 2a is a block diagram of exemplary aperture signal generation circuitry suitable for use in the camera shown in FIG. 1.

FIG. 2a is a block diagram of a first exemplary aperture signal generator 124. In the circuitry shown in FIG. 2a, the green signal (G) is applied to a high-pass filter (HPF) 210 and to one input port of a decision device 216. The red signal (R) is applied to HPF 212 and to a second input port of the decision device 216. The high-pass filtered green signal provided by HPF 210 is applied to one input port of a multiplexer 218 and to one input port of an adder 214. The other input port of the adder 214 is coupled to receive the high-pass filtered red video signal provided by filter 212. The output signal of adder 214 is applied to the second signal input port of multiplexer 218. Multiplexer 218 is controlled by a signal CONT provided by decision device 216 to pass either the high-pass filtered green color signal or the sum of the high-pass filtered green and red signals as the output signal PEAK. The decision device 216 compares the red and green color signals to generate the signal CONT. When the amplitude of the green signal is approximately equal to the red signal, the signal CONT conditions the multiplexer 218 to pass the high-pass filtered green color signal as the signal PEAK. When, however, there is a significant difference in the amplitudes of the red and green color signals, the control signal CONT conditions the multiplexer 218 to pass the sum of the high-pass filtered green and red signals as the signal PEAK.

By passing only the high-pass filtered green signal at instants when the amplitudes of the red and green primary color signals both have significant amplitudes, the circuitry shown in FIG. 2a avoids emphasizing misregistration in the image. By passing the combined high-frequency components of the red and green color signals at times when either the red signal amplitude is substantially greater that of the green signal or vice versa, the circuitry shown in FIG. 2a allows edges in both red objects and green objects to be emphasized.

The combined red and green high-frequency signals were chosen as the alternative peaking signal to avoid switching transients which may occur if a totally different signal (e.g. red) were chosen as the peaking signal. The circuitry shown in FIG. 2a makes no attempt to peak the luminance signal based on the blue color signal since very little of the luminance information (i.e. 11 percent) is conveyed in the blue color signal.

Figure 2B:
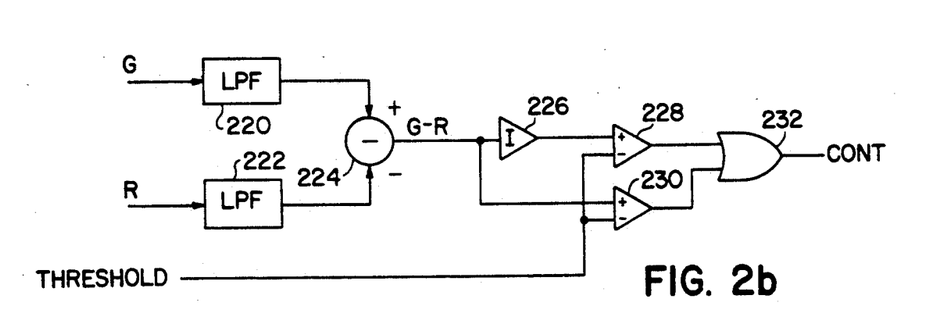

FIG. 2b shows exemplary circuitry suitable for use as the decision device 216. In this circuitry, the green and red color signals are applied to respective low-pass filters (LPF's) 220 and 222. The low-pass filtered red color signal is subtracted from the low-pass filtered green color signal by a subtracter 224. The output signal of the subtracter 224 is applied to an inverting circuit 226 and directly to a comparator 230. The output signal of the inverting circuit 226 is applied to a second comparator 228. Each of the comparators 228 and 230 is coupled to receive an externally supplied threshold signal. Comparator 230 generates an output signal which is in a logic-low state when the G-R signal provided by subtracter 224 is less than the threshold value and in a logic-high state otherwise. Conversely, the output signal of comparator 228 is in a logic-low state when the inverted G-R signal is less than the threshold value and in a logic-high state otherwise. The output signals of the comparators 228 and 230 are logically ORed by an OR-gate 232 to generate the control signal CONT.

The decision device 216 compares low-pass filtered red and green signals in order to spread the edges so that if it is desirable to switch the peaking signal, the switching occurs before and/or after the edge to be peaked.

Figure 2C:
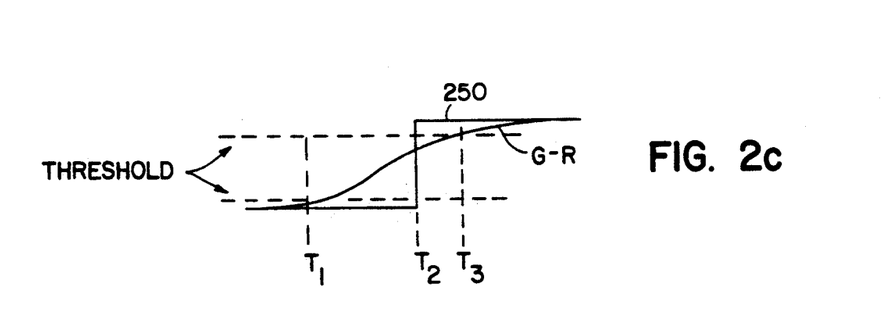
FIG. 2c and 2d are graphs of signal amplitude versus time which are useful for explaining the operation of the figures of the circuits shown in FIGS. 2a and 2b.
Figure 2D:
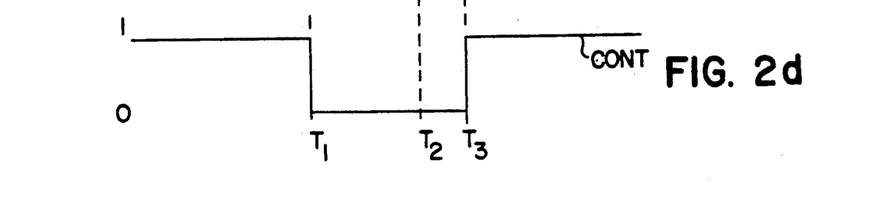

The operation of the circuitry shown in FIG. 2b is illustrated by the waveforms shown in FIGS. 2c and 2d. The waveform 250 in FIG. 2c represents a transition from red to green occurring at time $T_2$. As shown in the figure, the filtered G-R signal has spread this transition so that it begins at a time $T_1$ prior to time $T_2$, when the filtered G-R signal is greater than the negative threshold, and ends at a time $T_3$ after time $T_2$, when G-R is greater than the positive threshold. The signal CONT generated by the circuitry shown in FIG. 2B is illustrated in FIG. 2d. This signal has a logic-high value prior to time $T_1$ since the amplitude of the negative threshold is greater than the amplitude of the filtered G-R signal. At time $T_1$, the G-R signal is greater than the negative threshold value and so the signal CONT becomes logic-low. At time $T_3$, the amplitude of the filtered G-R signal is greater than the positive threshold causing the signal CONT to again become logic-high. After time $T_3$, the signal CONT remains logic-high since the amplitude of the filtered G-R signal is greater than that of the positive threshold signal.

For a transition from green to red, the signal CONT is logic-low both preceding and following the transition, during the interval that the signal (G-Y) is less than the positive threshold and greater than the negative threshold.

In the exemplary embodiments of the invention the threshold value or values may be set by the camera operator based on scene content and desired artistic effect. For images with little or no color, it may be desirable to use a relatively high threshold value while for colorful images it may be desirable to use a low threshold value.

Figure 3:
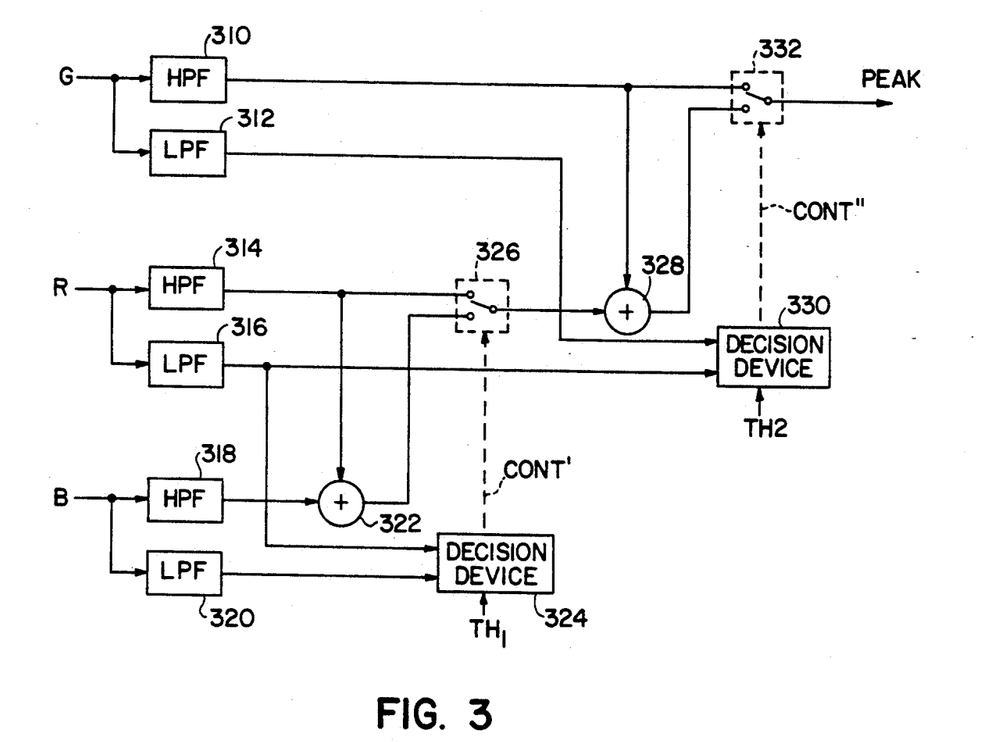
FIG. 3 is a block diagram of alternative aperture signal generation circuitry suitable for use in the camera shown in FIG. 1.

FIG. 3 is a block diagram of circuitry which provides either the high-pass filtered green color signal, a combination of the high-pass filtered green and red signals, or a combination of the high-pass filtered green, red and blue signals as the peaking signal PEAK. The circuitry shown in FIG. 3 may be considered to have two component parts. A first part generates a peaking signal component from the red and blue color signals and a second part combines this peaking signal with a peaking signal generated from the green color signal to produce the output peaking signal PEAK. The first part of the circuitry shown in FIG. 3 includes HPF 314, LPF 316, HPF 318, LPF 320, adder 322, decision device 324 and multiplexer 326. This circuitry operates in the same way as the aperture signal generator shown in FIGS. 2a and 2b. For the sake of economy and clarity, the LPF's 316 and 320 are shown as being separate from the decision device 324 in FIG. 3. A threshold value TH1 is applied to decision device 324.

The output signal of multiplexer 326 is the high-pass filtered red signal when the difference between the red and blue signal amplitudes is less than the threshold value TH1, and is a combination of the high-pass filtered red and blue color signals when the difference between the red and blue signals is outside of the range defined by the threshold value TH1. This output signal is applied to one input port of an adder 328, the other input port of which is coupled to receive the high-pass filtered green signal provided by a filter 310. The low-pass filtered green signal, provided by a filter 312 is applied to one signal input port of a decision device 330. The other signal input port of the decision device 330 is coupled to receive the low-pass filtered red color signal provided by LPF 316. A threshold value TH2 is applied to decision device 330.

The high-pass filtered green signal provided by filter 310 and the combined high-pass filtered signal provided by adder 328 are applied to two signal input ports of a multiplexer 332. The multiplexer 332 is controlled by a signal CONT" provided by the decision device 330. The high-pass filter 310, low-pass filter 312, adder 328, decision device 330 and multiplexer 332 operate in the same manner as the corresponding high-pass filter 210, low-pass filter 220, adder 214, decision device 216 and multiplexer 218 of the circuitry shown in FIGS. 2a and 2b.

The circuitry shown in FIG. 3 represents a slight advantage over that shown in FIG. 2 since high-frequency components of the blue color signal may be included in the peaking signal while steps are taken to avoid emphasizing misregistration between the red and blue color signals as well as between the red and green color signals.

Figure 4:
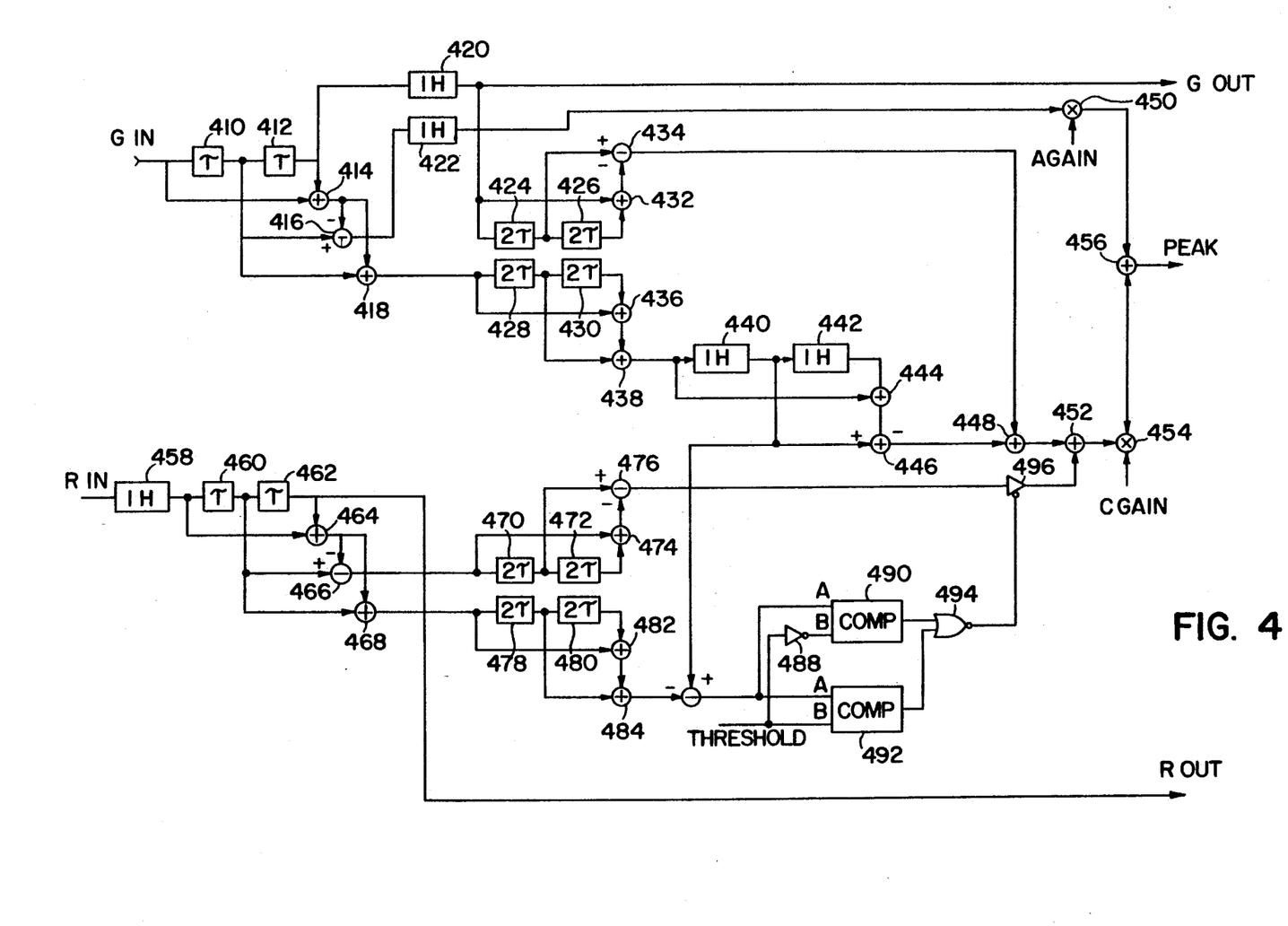
FIG. 4 is a block diagram, partly in logic diagram form, of combined horizontal and vertical aperture and contour signal generation circuitry suitable for use in the camera shown in FIG. 1.

FIG. 4 is a block diagram of aperture signal generation circuitry suitable for use in a high-definition television camera which includes an embodiment of the present invention. The peaking signal produced by this circuitry has two components. The first component is a conventional peaking signal such as that generated by the circuitry shown in FIGS. 2a and 2b. This component uses the green color signal or the red color signal plus the green color signal to generate a peaking signal which emphasizes components of the luminance signal in a band of frequencies centered about 16 megahertz (MHz). To distinguish this component from the other component of the peaking signal, it will be referred to below as the contour signal.

The other component of the peaking signal compensates for high-frequency roll-off in the signals produced by the camera. The frequency response characteristic of the camera is limited by the minimum spot size which may be achieved on the imager. This may be influenced by such factors as the size of the pixels and the quality of the optical systems used with the camera. This component of the peaking signal is used to flatten the frequency response characteristic of the camera in order to at least partially compensate for this high-frequency roll-off. In the exemplary embodiment of the invention, this component of the peaking signal is generated from the high-frequency components of the green color signal only and acts to emphasize components of the luminance signal in a band of frequencies centered about 24

MHz. In the following description, this component of the peaking signal is referred to as the aperture component.

The circuitry in FIG. 4 replaces the aperture signal generator 124 and the portions of the compensating delay element 122 which delay the green and red color signals.

In this circuitry, the green color signal is applied to a delay element 410 which, along with delay element 412, adders 414 and 418 and subtracter 416, form a finite impulse response (FIR) filter. As is well known in the art, the combination of the two serially connected delay elements 410 and 412 and the adder 414 in the configuration shown in FIG. 4 forms a low-pass filter having a frequency response characteristic which may be represented in z-transform notation by the polynomial $1+z^{-2}$. This signal is subtracted by a subtracter 416 from a delayed green color signal provided by the delay element 410.

This combination of the delay elements 410 and 412, the adder 414 and the subtracter 416 form a high-pass filter. The frequency response characteristic of this filter may be represented in z transform notation by the polynomial $-1+2z^{-1}-z^{-2}$. In the exemplary embodiment of the invention, this is a high-pass characteristic having a peak at 24 MHz. Thus, the output signal of subtracter 416 is a high-pass filtered green color signal.

The output signal of adder 414 is also added to the delayed green color signal provided by the delay element 410 in an adder 418 to produce a low-pass filtered output signal. The combination of the delay elements 410 and 412 and the adders 414 and 418 in the configuration shown in FIG. 4 is a low-pass filter having a frequency response characteristic which is represented by the polynomial $1+2z^{-1}+z^{-2}$. The output signal of delay element 412 is also applied to a compensating delay element 420. In the exemplary embodiment of the invention, the delay element 420 provides a delay of one horizontal line interval (1H). The output signal of this delay element is a green color video signal, GOUT, which has been delayed to compensate for processing delays through the aperture signal generation circuitry.

The green color signal provided by the delay element 420 is also applied to an FIR high-pass filter which is formed by the delay elements 424 and 426, the adder 432 and the subtracter 434. This high-pass filter has a frequency response characteristic which may be represented in z transform notation by the polynomial $-1+2z^{-2}-z^{-4}$. The output signal of subtracter 434 is a high-pass filtered green color video signal having a peak at 12 MHz. This signal is used as the green component of the horizontal contour signal.

As described above, the signal provided at the output port of delay element 422 is a high-pass filtered signal which has a peak at 24 MHz. This signal is the aperture component of the peaking signal. It is supplied to one input port of a multiplier 450, the other input port of which is coupled to receive a signal AGAIN. This signal scales the horizontal aperture signal to produce a peaking signal which, when added to the color video signals, compensates for the high-frequency roll-off in the video signals provided by the camera. The resulting signal appears to have been produced by a camera having a desired flat frequency response characteristic.

The output signal of the multiplier 450 is applied to one input port of an adder 456, the other input port of which is coupled to receive the contour signal as described below. The output signal of adder 456 is the signal, PEAK, provided by the aperture signal generator 124.

The low-pass filtered green color signal provided by the adder 418 is applied to a low-pass filter which includes delay elements 428 and 430 and adders 436 and 438. These components form a filter which has a low-pass frequency response characteristic represented by the z transform polynomial $1+2z^{-1}+3z^{-2}+4z^{-3}+3z^{-4}+2z^{-5}+z^{-6}$. The output signal of this filter is provided by the adder 438. This signal is applied to a vertical high-pass filter which includes 1H delay elements 440 and 442, adder 444, and subtracter 446. The output signal provided by this filter, the output signal of subtracter 446, is a vertical contour signal. It represents peaked high-frequency components in the vertical direction on the image screen. This signal is added to the green horizontal contour signal by the adder 448. The green contour signal provided by the adder 448 is applied to one input port of an adder 452. The other input port of the adder 452 is coupled to receive a red contour signal which is generated by circuitry described below. The output signal of the adder 452 is applied to one input port of a multiplier 454 which scales the contour signal by a value CGAIN to produce contour component of the signal PEAK.

To generate the red contour signal, the red color signal is applied to a compensating 1H delay element 458. The output signal of this delay element is applied to a low-pass filter which includes delay elements 460, 462 and adders 464 and 468. These components operate in the same manner as the delay elements 410, 412 and adders 414 and 418 described above. Thus, the output signal of delay element 462 is a delayed but unfiltered red color signal and the output signal of adder 468 is a low-pass filtered red color signal.

The delayed red signal is applied to a high-pass filter which includes delay elements 470 and 472, adder 474 and subtracter 476. This filter performs the same function as the filter described above which includes the delay elements 424 and 426, the adder 432 and the subtracter 434. The output signal of subtracter 476 is a high-pass filtered red contour signal which has a peak at 16 MHz. This signal is applied to a three-state gate 496, the output port of which is coupled to one input port of the adder 452.

The three-state gate 496 is controlled by a signal, generated by a NOR gate 494, to add the red contour signal to the green contour signal only when the difference between the low-pass filtered red and green signals is outside of a range defined by a threshold value.

The low-pass filtered green color video signal used to generate this control signal is provided by the delay element 440. The low-pass filtered red signal is generated by applying the output signal of adder 468 to a low-pass filter which includes delay elements 478 and 480 and adders 482 and 484. This filter is identical to the low-pass filter described above which includes delay elements 428 and 430 and adders 436 and 438. The low-pass filtered red color signal provided by adder 484 is subtracted from the low-pass filtered green color signal in a subtracter 486. This signal is applied to one input port of each of two comparators 490 and 492. The other input port of comparator 492 is coupled to receive the signal THRESHOLD while the other input port of comparator 490 is coupled to receive an inverted THRESHOLD signal provided by an inverter 488. The output signals of the comparators 492 and 490 are coupled to respective input terminals of the NOR gate 494.

When the difference between the low-pass filtered green color signal and the low-pass filtered red color signal is less than the threshold value and greater than the inverted threshold value, the control signal generated by the comparators 490 and 492 and the NOR gate 494 disables the three-state gate 496, causing a zero value to be added at the input port of adder 452. In this instance, all of the peaking signals, including the aperture signal and the horizontal and vertical contour signals, are generated from the green color signal.

When, however, the difference between the low-pass filtered green color signal and the low-pass filtered red color signal is greater than the threshold value or less than the inverted threshold value, the control signal generated by the NOR gate 494 allows the three-state gate 496 to pass the red contour signal to the adder 452. In this instance, the horizontal contour signal is the sum of the red and green contour signals, the vertical contour signal and the aperture signal are derived from the green color signal.

It is contemplated that one of ordinary skill in the art, using the techniques taught above could modify the circuitry shown in FIGS. 1-4 by adding circuitry to the aperture signal generator shown in FIG. 4, circuitry to generate a red vertical contour signal and a red aperture signal. These signals could be selectively combined using decision devices of the type shown in FIG. 2b to produce a more general peaking circuit in which both horizontal and vertical contours are adjusted adaptively by either the green color signal or a combination of the green and red color difference signals.

In addition, it is contemplated that the blue color signal may be included as a source signal for the aperture signal generation circuitry using techniques similar to those shown in FIG. 3.

While the invention has been described in terms of digital embodiments, it is contemplated that it may be practiced using analog circuitry, for example, using charged-coupled devices for the various delay elements shown in FIG. 4, operational amplifiers for the subtracters and summing junctions for the adders. The multipliers 450 and 454 may be implemented using potentiometers or two quadrant multipliers.

While the invention has been described in terms of several exemplary embodiments, it is contemplated that it may be practiced as outlined above with variations within the spirit and scope of the appended claims.

What is claimed is:

1. Video signal processing apparatus that processes at least first and second color information signals to generate an adaptive output peaking signal, said apparatus comprising:
   first filtering means for applying a high-pass frequency response characteristic to said first color information signal to generate a first peaking signal;
   second filtering means for applying a high-pass frequency response characteristic to said second color information signal to generate a second peaking signal;
   comparison means including:
   low-pass filtering means for applying respective low-pass frequency response characteristics to said first and second color information signals to generate respective first and second low-pass filtered color information signals;
   means for subtracting one of said first and second low-pass filtered color information signals from the other one of said first and second low-pass filtered color information signals to generate a difference signal; and
   means for comparing said difference signal, in magnitude, to a predetermined threshold value and for setting said control signal to said first state when the magnitude of the difference signal is less than the threshold value and to said second state when the magnitude of the difference signal is greater than the threshold value; and
   selection means for providing said first peaking signal as said output peaking signal when said control signal is in said first state and for providing a combination of the first and second peaking signals as said output peaking signal when said control signal is in said second state.

2. Video signal processing apparatus according to claim 1, wherein said video signal processing apparatus is in a video camera and said first and second color information signals are green and red color video signals, respectively.

3. Video signal processing apparatus according to claim 1 wherein said video signal processor processes first, second and third color information signals and said apparatus further comprises:
   third filtering means for applying a high-pass frequency response characteristic to said third color information signal to generate a third peaking signal;
   further comparison means for generating a further control signal which is in said first state when one of said second and third color information signals differs in magnitude from the other one of said second and third color information signals by less than a further predetermined threshold value and is in said second state otherwise; and
   further selection means for providing said second peaking signal to said selection means when said further control signal is in said first state and for providing a combination of the second and third peaking signals to said selection means when said further control signal is in said second state.

4. Apparatus that processes at least first and second color information signals to adaptively generate a peaking signal, comprising:
   first filtering means for applying a first high-pass frequency response characteristic, having a first predetermined peak frequency, to said first and second color information signals to generate respective first and second contour correction signals;
   second filtering means for applying a second high-pass frequency response characteristic, having a second predetermined peak frequency greater than said first predetermined peak frequency, to said first color information signal to generate an aperture correction signal;
   comparison means for generating a control signal which is in a first state when one of said first and second color information signals differs in magnitude from the other one of said first and second color information signals by less than a predetermined threshold value and is in a second state otherwise;
   selection means for providing said first contour correction signal as an output signal when said control signal is in said first state and for providing a combination of the first and second contour correction signals as said output signal when said control signal is in said second state; and means for combining the output signal of the selection means and the aperture correction signal to generate the peaking signal.

5. Apparatus according to claim 4, further comprising:

first scaling means for scaling the aperture correction signal by a first operator defined factor to provide a scaled aperture correction signal; and second scaling means for scaling the output signal of the selection means by a second operator defined factor to provide a scaled contour correction signal;

wherein the means for combining the output signal of the selection means and the aperture correction signal combines the scaled aperture correction signal with the scaled contour correction signal.

6. Apparatus according to claim 5, wherein said comparison means includes:

third filtering means for applying respective low-pass frequency response characteristics to said first and second color information signals to generate respective first and second low-pass filtered color information signals;

means for subtracting one of said first and second low-pass filtered color information signals from the other one of said first and second low-pass filtered color information signals to generate a difference signal; and means for comparing said difference signal, in magnitude, to a predetermined threshold value and for setting said control signal to said first state when the magnitude of the difference signal is less than the threshold value and to said second state when the magnitude of the difference signal is greater than the threshold value.

7. Apparatus according to claim 6, further including spatial filtering means for generating a vertical contour signal representing spatial frequency components of said first color information signal which correspond, in frequency to said first contour correction signal but represent vertical spatial frequency components of said first color information signal; and means for combining the vertical contour signal with the first contour signal to generate a composite contour signal which is applied to said selection means.

8. Apparatus according to claim 6, wherein said apparatus is in a video camera and said first and second color information signals are green and red color video signals, respectively.

* * * * *